United States Patent [19]
Ott et al.

[11] Patent Number: 5,324,404
[45] Date of Patent: Jun. 28, 1994

[54] PROCESS FOR THE COATING OF ELECTRICALLY CONDUCTING SUBSTRATES, AQUEOUS PAINT, EPOXIDE-AMINE ADDUCT AND USE OF THE EPOXIDE-AMINE ADDUCT AS GRINDING RESIN IN THE PRODUCTION OF PIGMENT PASTES

[75] Inventors: Günther Ott; Ulrich Heimann, both of Münster; Udo Reiter, Telgte, all of Fed. Rep. of Germany; David J. Santure, Novi, Mich.; Thomas Brücken; Walter Jouck, both of Münster, Fed. Rep. of Germany

[73] Assignee: BASF Lacke + Farben Aktiengesellschaft, Munster, Fed. Rep. of Germany

[21] Appl. No.: 862,577

[22] PCT Filed: Dec. 17, 1990

[86] PCT No.: PCT/EP90/02211

§ 371 Date: Jul. 28, 1992

§ 102(e) Date: Jul. 28, 1992

[87] PCT Pub. No.: WO91/09917

PCT Pub. Date: Jul. 11, 1991

[30] Foreign Application Priority Data

Dec. 23, 1989 [DE] Fed. Rep. of Germany ....... 3942766

[51] Int. Cl.$^5$ .............................................. C25D 13/06
[52] U.S. Cl. .................................. 204/181.7; 523/404; 525/484; 525/524; 525/526
[58] Field of Search ..................... 525/484, 526, 524; 523/404; 204/181.7

[56] References Cited

U.S. PATENT DOCUMENTS 4,659,800  4/1987  Daimer et al. ...................... 528/103
4,661,541  4/1987  Batzill et al. ........................ 525/408
4,824,927  4/1989  Dobbelstein et al. ............... 525/507

Primary Examiner—Melvyn I. Marquis
Assistant Examiner—David Aylward

[57] ABSTRACT

In order to increase the stone chip resistance of automobile finishes aqueous electrocoating paints are used which are produced by the use of a pigment paste which contains as grinding resin an at least partially protonated epoxide-amine adduct which is obtainable by reacting (A) a glycidyl ether of a polyphenol which contains on statistical average at least one epoxide group in the molecule, or a mixture of such glycidyl ethers, (B) a polyglycidyl ether of a polyol which contains on statistical average more than 1.0 epoxide groups in the molecule, or a mixture of such polyglycidyl ethers, and (C) a compound which contains a primary amino group in the molecule or a mixture of such compounds with each other in such a stoichiometric ratio that an epoxide-amine adduct is obtained in which on statistical average at least 2.0 primary amino groups of the component (C) are incorporated in a chain-extending function with the formation of tertiary amino groups and the resultant epoxide-amine addict is at least partially protonated.

20 Claims, No Drawings

PROCESS FOR THE COATING OF ELECTRICALLY CONDUCTING SUBSTRATES, AQUEOUS PAINT, EPOXIDE-AMINE ADDUCT AND USE OF THE EPOXIDE-AMINE ADDUCT AS GRINDING RESIN IN THE PRODUCTION OF PIGMENT PASTES

The invention relates to a process for the coating of electrically conducting substrates in which
(1) the electrically conducting substrate is immersed in an aqueous electrocoating paint,
(2) the substrate is connected as cathode,
(3) a film is deposited on the substrate using direct current,
(4) the coated substrate is removed from the electrocoating paint and
(5) the deposited paint film is baked.

The invention also relates to an aqueous paint, an epoxide-amine adduct and the use of the epoxide-amine adduct as grinding resin for the production of aqueous pigment pastes.

The cathodic electrocoating process described above is known (cf. for example DE-OS-3,518,732, DE-OS-3,518,770, EP-A-4,090, EP-A-12,463 and EP-A-262,069) and is employed in particular for the priming of automobile bodies. The resultant paint films are usually coated with at least one filler coat and at least one topcoat.

The object of the present invention is to provide a novel cathodic electrocoating process. The object of the invention comprises in particular the provision of novel aqueous paints for the electrocoating process described above.

Surprisingly, this object is achieved by a cathodic electrocoating process wherein the aqueous electrocoating paint is produced using a pigment paste which contains as grinding resin an at least partially protonated epoxide-amine adduct which is obtainable by reacting
(A) a glycidyl ether of a polyphenol which contains on statistical average at least one epoxide group in the molecule, or a mixture of such glycidyl ethers,
(B) a polyglycidyl ether of a polyol which contains on statistical average more than 1.0 epoxide groups in the molecule, or a mixture of such polyglycidyl ethers and
(C) a compound which contains a primary amino group in the molecule or a mixture of such compounds
with each other in such a stoichiometric ratio that an epoxide-amine adduct is obtained in which on statistical average at least 2.0 primary amino groups of the component (C) are incorporated in a chain-extending function with the formation of tertiary amino groups and the resultant epoxide-amine adduct is at least partially protonated. The paint films produced by the process according to the invention are distinguished in particular by the fact that, surprisingly, they possess high stone chip resistance (both as a single-coat coating and in a multicoat paint system), high flexibility and good corrosion resistance. The electrocoating paints used according to the invention are distinguished by high dielectric strength, good throwing power and low organic solvent contents. The high stone chip resistance of the resultant coatings in particular could not have been foreseen in view of the fact that high flexibility of the electrocoating paint film is no guarantee of high stone chip resistance—especially in multicoat coatings. EP-A-253,404 describes electrocoating paints which contain a cationic reaction product from a diglycidyl ether of a diphenol, a diglycidyl ether of a polyol, a diphenol and a nucleophilic compound. There are great differences between the chemical structure of the reaction products described in EP-A-253,404 and the chemical structure of the grinding resins according to the invention.

The electrocoating paints used according to the invention contain at least one cathodically depositable synthetic resin, at least one crosslinking agent and pigments, as well as, if appropriate, fillers and other generally wellknown additives such as antifoams, flow-control agents etc.

The pigments and fillers are incorporated in the electrocoating paints in the form of pigment pastes. The pigment pastes are produced—as a person skilled in the art is aware of—by grinding the pigments in the presence of a suitable grinding resin.

It is an essential part of the invention that the electrocoating paints are produced by the use of a pigment paste which contains as grinding resin an at least partially protonated epoxide-amine adduct which is obtainable by reacting
(A) a glycidyl ether of a polyphenol which contains on statistical average at least one epoxide group in the molecule, or a mixture of such glycidyl ethers,
(B) a polyglycidyl ether of a polyol which contains on statistical average more than 1.0 epoxide groups in the molecule, or a mixture of such polyglycidyl ethers and
(C) a compound which contains a primary amino group in the molecule or a mixture of such compounds
with each other in such a stoichiometric ratio that an epoxide-amine adduct is obtained in which on statistical average at least 2.0 primary amino groups of the component (C) are incorporated in a chain-extending function with the formation of tertiary amino groups and the resultant epoxide-amine adduct is at least partially protonated.

The grinding resins used according to the invention are prepared by reacting the components (A), (B) and (C) with each other in such a stoichiometric ratio that an epoxide-amine adduct is obtained in which on statistical average at least 2.0 primary amino groups of the component (C) are incorporated in a chain-extending function with the formation of tertiary amino groups and the epoxide-amine adduct obtained in this manner is at least partially protonated. The epoxide-amine adduct obtained from (A), (B) and (C) should preferably be free from epoxide groups. Should it still contain epoxide groups, it is expedient to react the residual epoxide groups with compounds such as, for example, monophenols and amines, in particular secondary amines (examples of compounds which are suitable for a reaction with still remaining epoxide groups, are listed in EP-A-253,404 on page 8 from line 28 to line 37 and page 9 line 16 to page 10 line 15). The components (A) and (B) are expediently used in an equivalent ratio of 1.0:0.5 to 1.0:8.0 and the component (C) is used in such amount that 0.3 to 0.7 mol of the component (C) are allotted to one equivalent of epoxide groups from (A) and (B). Preferred grinding resins are obtained if the components (A) and (B) are used in an equivalent ratio of 1.0:1.0 to 1.0:2.0 and if the component (C) is used in such an amount that 0.4 to 0.6 mol of the component (C) are allotted to one equivalent of epoxide groups from (A) and (B). The number average molecular weight of the grinding resins according to the invention should be between 1,000 and 100,000, preferably between 3,000 and 15,000. The component (C) can be reacted with (A) and (B) consecutively or—preferably—with a mixture of (A) and (B). The reaction of the components ( A), ( B ) and ( C ) can proceed already at room temperature. To achieve economical conversion times it is expedient to increase the reaction temperature, for example to 60°-130° C. The reaction of the components (A), (B) and (C) is preferably carried out in an organic solvent such as, for example, ethylene glycol monobutyl ether or propylene glycol monobutyl ether. The reaction mixture is then neutralized with an acid, such as, for example, acetic acid or lactic acid and is transferred to an aqueous dispersion or solution. The dispersion or solution obtained in this manner can then be used according to generally well-known methods for the preparation of aqueous pigment pastes. It is also possible to mix the reaction product obtained from (A), (B) and (C), dissolved in an organic solvent, with pigments and, if appropriate, fillers and to process the mixture further to a pigment paste with the addition of an acid and, if appropriate, water.

Using the grinding resins according to the invention it is possible to prepare pigment pastes which are distinguished by an outstanding shelf life.

Mixtures of the grinding resins according to the invention may of course also be used.

In principle, the pigment pastes may contain all the pigments suitable for electrocoating paints. Generally titanium dioxide is the sole or the principal white pigment. However, other white pigments or extenders, such as antimony oxide, zinc oxide, basic lead carbonate, basic lead sulfate, barium carbonate, porcelain, clay, calcium carbonate, aluminum silicate, silicon dioxide, magnesium carbonate and magnesium silicate, may also be used. Cadmium yellow, cadmium red, carbon black, phthalocyanine blue, chrome yellow, toluidyl red and hydrated iron oxide, for example, may be used as colored pigments.

In addition to the pigments, the pigment paste may also contain plasticizers, fillers, wetting agents etc.

Any glycidyl ether of a polyphenol which contains on statistical average at least one epoxide group in the molecule, or a mixture of such glycidyl ethers, may in principle be used as the component (A). For example, the glycidyl ethers of the general structural formulae (I) and (II), to be found on page 4 of EP-A-253,404, may be used as the component (A). Bisphenol A diglycidyl ethers, modified with the component (b) (cf. below) if appropriate, having an epoxide equivalent weight of 180 to 3,000, preferably 180 to 1,000, are preferably used as the component (A). Those mixtures of glycidyl ethers are particularly preferably used as the component (A) which are obtainable by preparing, in the presence of a catalyst which catalyzes the reaction between phenolic hydroxyl groups and epoxide groups, from (a) a diglycidyl ether of a polyphenol, preferably a diglycidyl ether of bisphenol A having a number average molecular weight of 260 to 450, preferably of 370 to 380, or a mixture of such diglycidyl ethers, (b) an unsubstituted or substituted monophenol, preferably an alkyl phenol having 1 to 18, preferably 4 to 12 carbon atoms in the alkyl radical, or a mixture of such monophenols, and (c) a diphenol, preferably bisphenol A and/or a catalyst which catalyzes the reaction between aliphatic hydroxyl groups and epoxide groups glycidyl ethers which have a number average molecular weight of 980 to 4,000, preferably 980 to 2,000 and contain on statistical average 1.0 to 3.0, preferably 1.2 to 1.6 epoxide groups and 0.25 to 1.3, preferably 0.4 to 0.9 phenyl ether groups derived from the component (b) per molecule.

The preparation of the particularly preferably used component (A) is carried out preferably in organic solvents such as, for example, xylene, ethylene glycol monobutyl ether or propylene glycol monobutyl ether. The reaction temperatures are expediently between 100°-180° C. Catalysts which catalyze the reaction between phenolic hydroxyl groups and epoxide groups, are known to the person skilled in the art. They are, for example, triphenylphoshine and the catalysts listed on page 9, lines 6 to 9, of EP-A-253,404.

The component (c) should ensure that higher-molecular glycidyl ethers are synthesized from the component (a). This synthesis can be achieved by a chain extension using a diphenol, preferably bisphenol A. However, the synthesis can also be carried out by the reaction of the aliphatic hydroxyl groups contained in the component (a) or in the reaction product obtained from (a) and (b), with epoxide groups. To be able to utilize this reaction specifically for the synthesis of the desired glycidyl ethers, catalysts must be used (for example tertiary amines) which catalyze the reaction between aliphatic hydroxyl groups and epoxide groups. By using a diphenol and a catalyst according to (c) it is possible to utilize both synthesis reactions, the chain extension via the diphenol and the addition reaction between aliphatic hydroxyl groups and epoxide groups. The reaction with the component (b) should modify the preferred glycidyl ethers and should lead to the formation of aliphatic hydroxyl groups which are required when synthesis reactions should take place via addition reactions of aliphatic hydroxyl groups with epoxide groups.

Specifying the number average molecular weight of the particularly preferred component (A) to be prepared and specifying the epoxide groups contained in the component (A) and the phenyl ether groups derived from the component (b) allows a person skilled in the art to calculate readily the amounts of (a), (b) and (c) to be used. If the synthesis reactions taking place via the reaction of aliphatic hydroxyl groups and epoxide groups are used, the synthesis reaction must be terminated after the epoxide equivalent weight which can be calculated by the person skilled in the art from the number average molecular weight to be aimed for and the epoxide group contents to be aimed for, has been reached. This is expediently effected by lowering the temperature and diluting the reaction mixture.

Any polyglycidyl ether of a polyol which contains on statistical average more than 1.0 epoxide groups in the molecule, or a mixture of such polyglycidyl ethers, may in principle be used as the component (B). The polyglycidyl ethers which are described in EP-A-253,404 from line 42 on page 4 to line 13 on page 8, for example, may be used as the component (B).

Polyglycidyl ethers of polyether polyols, particularly preferably diglycidyl ethers of polyether diols having number average molecular weights of 300 to 3,000, preferably 400 to 1,200, are preferably used as the component (B). Examples of particularly preferred polyglycidyl ethers are diglycidyl ethers of poly(ethylene glycol), poly(propylene glycol), poly(ethylene glycol propylene glycol) and poly(1,4-butanediol), the number average molecular weights of the diglycidyl ethers being between 300 and 3,000, preferably between 400 and 1,200.

A compound which contains a primary amino group in the molecule, or a mixture of such compounds, is used as the component (C). The component (C) may contain one primary amino group only in the molecule. The component (C) may contain, besides the primary amino group, further functional groups, such as, for example, tertiary amino groups and hydroxyl groups. The component (C) is incorporated in the epoxide-amine adduct according to the invention with the formation of tertiary amino groups. To this end a primary amino group reacts with two epoxide groups and thus joins together in a chain-extending function two molecules of the components (A) and/or (B). A part of the component (C) can also react with terminal epoxide groups with the formation of secondary amino groups.

Any compound which contains one and only one primary amino group in the molecule can in principle be used as the component (C). Examples of such compounds are compounds of the general formula $H_2N—CR_1R_2—R_3—O(CHR_4—CHR_5O)_nR_6$. In this formula $R_1$ and $R_2$ are hydrogen, alkyl groups or —CH—OH groups, $R_3$ is a linear or branched alkylene radical, in particular an alkylene radical having 1 to 3 carbon atoms, $R_4$ and $R_5$ are hydrogen or alkyl radicals having 1 to 4 carbon atoms, $R_6$ is hydrogen, an alkyl, cycloalkyl or phenyl radical, preferably an alkyl radical having 1 to 6 carbon atoms, and n=0–5. Examples of useful compounds of this type are: ethanolamine, propanolamine, butanolamine, 2-amino-2-methyl-1-propanol ($H_2N—C(CH_3)_2—CH_2OH$), 2-amino-2-ethyl-1-propanol and ethoxylated and/or propoxylated ethanolamine or propanolamine, such as, for example, 2,2'-aminoethoxyethanol ($H_2N—CH_2—CH_2—O—CH_2—CH_2—OH$) and diethylene glycol mono(3-aminopropyl) ether ($H_2N—(CH_2)_3—O—CH_2—CH_2—O—CH_2—CH_2—OH$).

Compounds which contain a primary and a tertiary amino group in the molecule, may be also used as the component (C). Examples which may be mentioned are: N,N-dimethylaminopropylamine, N,N-diethylaminoethylamine and the like. Primary alkylamines, such as, for example, hexylamine, may also be used as the component (C). Unsubstituted or substituted aniline may also be used as the component (C). Hexylamine and N,N-dimethylaminopropylamine as well as 2,2'-aminoethoxyethanol are preferably used as the component (C).

The electrocoating paints used according to the invention contain, in addition to the pigment paste prepared with the grinding resin according to the invention, also at least one cathodically depositable synthetic resin as well as, if appropriate, at least one crosslinking agent.

The electrocoating paints used according to the invention may in principle contain all the cathodically depositable, non-self-curing or self-curing synthetic resins which are suitable for the preparation of electrocoating paints. The electrocoating paints used according to the invention may also contain mixtures of various cathodically depositable synthetic resins.

However, preferred electrocoating paints are those which contain cationic, amine-modified epoxy resins as cathodically depositable synthetic resins. Self-curing as well as non-self-curing cationic amine-modified epoxy resins are known. Non-self-curing cationic, amine-modified epoxy resins, are preferably used. The preparation of cationic amine-modified epoxy resins is known and is described, for example, in the following patents: DE-OS-3,518,732, DE-OS-3,518,770, EP-A-4,090 and EP-A-12,463. Cationic amine-modified epoxy resins are understood to be cationic reaction products obtained from
(i) unmodified or modified polyepoxides and
(ii) amines.

Polyepoxides are understood to be compounds which contain two or more epoxide groups in the molecule.

Particularly preferred components (i) are compounds which can be prepared by reacting
(j) a diepoxide compound or a mixture of diepoxide compounds having an epoxide equivalent weight below 2,000 with
(jj) a compound reacting under the given reaction conditions monofunctionally toward epoxide groups and containing a phenol or thiol group, or a mixture of such compounds,
the components (j) and (jj) being used in a molar ratio of 10:1 to 1:1, preferably 4:1 to 1.5:1, and the reaction being carried out in the presence of a catalyst which catalyzes the reaction between aliphatic hydroxyl groups and epoxide groups to give an epoxide equivalent weight of 600 to 2,000, preferably 800 to 1,400 (cf. DE-OS-3,518,770).

Other particularly preferred components (i) are compounds which can be prepared by a polyaddition carried out at 100° to 195° C. in the presence or absence of a catalyst and initiated by a monofunctionally reacting initiator carrying either an alcoholic OH group, a phenolic OH group or an SH group, of a diepoxide compound and/or a mixture of diepoxide compounds together, if appropriate, with at least one monoepoxide compound to give an epoxy resin in which the diepoxide compound and the initiator are incorporated in a molar ratio from greater than 2:1 to 10:1 (cf. DE-OS-3,518,732).

The polyepoxides which can be used for the preparation of the particularly preferred components (i) and can even be used as the components (i) themselves, are polyglycidyl ethers of polyphenols prepared from polyphenols and epihalohydrines. Bisphenol A and Bisphenol F, for example, can be used particularly preferably as the polyphenols. Other suitable compounds are 4,4'-dihydroxybenzophenone, bis ( 4-hydroxyphenyl ) -1,1-ethane, bis ( 4-hydroxyphenyl )-1,1-isobutane, bis (4-hydroxy-tert-butylphenyl)-2,2-propane, bis( 2-hydroxynaphthyl)methane, 1,5-dihydroxynaphthalene and phenolic novalak resins.

Further suitable polyepoxides are polyglycidyl ethers of polyhydric alcohols such as, for example, ethylene glycol, diethylene glycol, triethylene glycol, 1,2-propylene glycol, 1,4-propylene glycol, 1,5-pentanediol, 1,2,6-hexanetriol, glycerol and bis ( 4-hydroxycyclohexyl)-2,2-propane.

Polyglycidyl esters of polycarboxylic acids such as, for example, oxalic acid, succinic acid, glutaric acid, terephthalic acid, 2,6-naphthalenedicarboxylic acid and dimerized linolic acid may be also used. Typical examples are glycidyl adipate and glycidyl phthalate.

Furthermore hydantoin epoxides, epoxidized polybutadiene and polyepoxide compounds which are obtained by epoxidation of an olefinically unsaturated aliphatic compound, are suitable.

Modified polyepoxides are understood to be polyepoxides in which some of the reactive groups have been reacted with a modifying compound.

Examples of modifying compounds are as follows:

a) compounds containing carboxyl groups, such as saturated or unsaturated monocarboxylic acids (for example benzoic acid, linseed fatty acid, 2-ethylhexanoic acid, versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid, dimethylolpropionic acid) as well as polyesters containing carboxyl groups, or b) compounds containing amino groups such as diethylamine or ethylhexylamine or diamines with secondary amino groups, for example N,N'-dialkylalenediamines (sic) such as dimethylethylenediamine, N,N'-dialkylpolyoxyalkyleneamines such as N,N'-dimethylpolyoxypropylenediamine, cyanalkylated alkylenediamines such as bis-N,N'-cyanethylethylenediamine, cyanalkylated polyoxyalkyleneamines such as bis-N,N'-cyanethylpolyoxypropylenediamine, polyaminoamides such as, for example, vetsamides, particularly terminal amino groups-containing reaction products obtained from diamines, for example hexamethylenediamine), polycarboxylic acids, in particular dimeric fatty acids and monocarboxylic acids, in particular fatty acids, or the reaction product of one mole of diaminohexane with two moles of monoglycidyl ether or monoglycidyl ester, particularly glycidyl esters of α-branched fatty acids, such as versatic acid, or c) compounds containing hydroxyl groups, such as neopentyl glycol, bis-ethoxylated neopentyl glycol, neopentyl glycol hydroxypivalates, dimethylhydantoin-N,N'-diethanoi, 1,6-hexanediol, 2,5-hexanediol, 1,4-bis(-hydroxymethyl)cyclohexane, 1,1-isopropylidene-bis(p-phenoxy)-2-propanol, trimethylolpropane, pentaerythritol or aminoalcohols such as triethanolamine, methyldiethanolamine or alkylketimines containing hydroxyl groups such as aminomethyl-propanediol-1,3-methylisobutylketimine or tris(hydroxymethyl)aminomethanecyclohexanoneketimine as well as polyglycol ethers, polyester polyols, polyether polyols, polycaprolactone polyols, polycaprolactam polyols of various functionality and molecular weights or d) saturated or unsaturated fatty acid methyl esters which are transesterified with the hydroxyl groups of the epoxy resins in the presence of sodium methylate.

Primary and/or secondary amines may be used as the component (ii).

The amine should preferably be a water-soluble compound. Examples of such amines are monoalkylamines and dialkylamines such as methylamine, ethylamine, propylamine, butylamine, dimethylamine, diethylamine, dipropylamine, methylbutylamine and the like. Equally suitable are alkanolamines such as, for example, methylethanolamine, diethanolamine and the like. Furthermore, dialkylaminoalkylamines such as, for example, dimethylaminoethylamine, diethylaminopropylamine, dimethylaminopropylamine and the like are suitable. In most cases low-molecular amines are used, but it is also possible to use high-molecular monoamines.

The amines may also contain still further groups which, however, must not interfere with the reaction of the amine with the epoxide group and must not lead to the gelling of the reaction mixture.

Secondary amines are preferably used as the components (ii).

The charges which are required for water thinnability and electrical deposition can be produced by protonization using water-soluble acids (for example boric acid, formic acid, lactic acid and, preferably, acetic acid).

A further possibility of introducing cationic groups in the component (i) consists in the reaction of epoxide groups of the component (i) with amine salts.

The cationic amine-modified epoxy resins may be used both as non-self-curing synthetic resins and as self-curing synthetic resins. Self-curing cationic amine-modified epoxy resins may be obtained, for example, by a chemical modification of the cationic amine-modified epoxy resins. A self-curing system can be obtained, for example, by reacting the cationic amine-modified epoxy resin with a partially blocked polyisocyanate which contains on average one free isocyanate group per molecule and whose blocked isocyanate groups become unblocked only at elevated temperatures.

Preferred electrocoating paints are obtained when non-self-curing cationic amine-modified epoxy resins are used as the cathodically depositable synthetic resins in combination with a suitable crosslinking agent.

Examples of suitable crosslinking agents are phenolics, polyfunctional Mannich bases, melamine resins, benzoguanamine resins, blocked polyisocyanates and compounds containing at least two groups of the general formula $R^1$—O—CO.

The radical $R^1$ is:
$R^1 = R^2O$—CO—$CH_2$—, $R^3$—CHOH—$CH_2$, $R^4$—CHOR$^5$—CHOH—$CH_2$—
$R^2$ = or alkyl
$R^3$ = H, alkyl, $R^6$—O—$CH_2$ or $R^6$—CO—O—$CH_2$—
$R^4$ = H or alkyl
$R^5$ = H, alkyl or aryl
$R^6$ = alkyl, cycloalkyl or aryl.

Preferred electrocoating paints are obtained when blocked polyisocyanates are used as the crosslinking agent.

Any polyisocyanates in which the isocyanate groups have been reacted with a compound in such a way that the blocked polyisocyanate formed is resistant toward hydroxyl and amino groups at room temperature but is reactive at elevated temperatures, usually in the range from about 90° C. to about 300° C. may be used as blocked polyisocyanates. Any organic polyisocyanates which are suitable for the crosslinking, may be used in the preparation of the blocked polyisocyanates. Isocyanates which contain about 3 to 36, in particular about 8 to 15 carbon atoms, are preferred. Examples of suitable diisocyanates are: hexamethylene diisocyanate, 2,4-toluylene diisocyanate, 2,6-toluylene diisocyanate and 1-isocyanatomethyl-5-isocyanato- 1,3,3-trimethylcyclohexane. Polyisocyanates of higher isocyanate functionality may also be used. Appropriate examples are trimerized hexamethylene diisocyanate and trimerized isophorone diisocyanate. Furthermore, mixtures of polyisocyanates may also be used. The organic polyisocyanates which are suitable as crosslinking agents according to the invention may also be prepolymers derived, for example, from a polyol including a polyether polyol or a polyester polyol.

Any suitable aliphatic, cycloaliphatic or aromatic alkylmonoalcohols may be used for the blocking of the polyisocyanates. Suitable examples are aliphatic alcohols such as methyl, ethyl, chloroethyl, propyl, butyl, amyl, hexyl, heptyl, octyl, nonyl, 3,3,5-trimethylhexyl, decyl and laurylalcohol; cycloaliphatic alcohols such as cyclopentanol and cyclohexanol; aromatic alkylalcohols such as phenylcarbinol and methylphenylcarbinol.

Other suitable blocking agents are hydroxylamines such as ethanolamine, oximes such as methyl ethyl ketone oxime, acetone oxime and cyclohexanone oxime, and amines such as dibutylamine and diisopropylamine. The polyisocyanates and blocking agents mentioned may also be used in suitable proportions for the preparation of the partially blocked polyisocyanates mentioned above.

The crosslinking agent is usually used in an amount of 5 to 60% by weight, preferably 20 to 40% by weight, based on the cationic amine-modified epoxy resin. The pigment paste is added to the aqueous dispersion of the cathodically depositable synthetic resin in such an amount that the finished electrocoating paint possesses the properties required for the deposition. The weight ratio between the grinding resin and the cathodically depositable synthetic resin is between 0.05 and 0.5, preferably between 0.1 and 0.2.

The electrocoating paints used according to the invention may also contain, besides the cathodically depositable synthetic resin, the grinding resin and the pigments, further conventional additives such as, for example, additional solvents, antioxidants, surfactants etc.

The solids content of the electrocoating paints used according to the invention is preferably 7 to 35 parts by weight, particularly preferably 12to 25 parts by weight. The pH of the electroCoating paints is between 4 and 8, preferably between 5 and 7.5.

The electrocoating paint is brought into contact with an electrically conducting anode and with the electrically conducting substrate connected as cathode. When electric current passes between the anode and the cathode, a firmly adhering paint film is deposited on the cathode.

The applied voltage may fluctuate within a considerable range and may be, for example, between two and one thousand volts. However, typical working voltages are between 50 and 500 volts. The current density is usually between about 10 and 100 amperes/m$^2$. Current density tends to drop during the deposition.

After deposition the coated object is rinsed and is ready for baking.

The deposited paint films are generally baked at temperatures of 130° to 200° C. for a period of 10 to 60 minutes, preferably at 150° to 180° C. for a period of 15 to 30 minutes.

The process according to the invention may be used for the coating of any electrically conducting substrates, in particular, however for the coating of metals such as steel, aluminum, copper and the like.

The aqueous paints according to the invention may also be applied by spraying, brushing, blade-coating etc. both to electrically conducting and to electrically nonconducting substrates.

The invention is elucidated in greater detail in the following examples. All parts and percentages are parts and percentages by weight, unless expressly stated otherwise.

1. Grinding resins

1.1 Grinding resin A1

752 g of an epoxy resin[1]) based on hisphenol A having an epoxide equivalent weight (EEW) of 188 (4 equivalents), 228 g of bisphenol A ( 1 mol ), 262 [lacuna] of dodecylphenol (1 mol) and 64 g of butyl glycol are introduced into a reaction vessel fitted with a stirrer, internal thermometer, nitrogen inlet and water separator with a reflux condenser. The reaction mixture is heated to 110° C. 50 g of xylene are added and the mixture is distilled again under slightly reduced pressure together with all possible traces of water. 1.6 g of triphenylphosphine are then added and the mixture is heated to 130° C. After an exothermic temperature rise to 150° C. the reaction is allowed to proceed for a further hour at 130° C.

[1]) designated in the following as expoxy resin (EEW 188)

The EEW of the reaction mixture is then about 1240. The reaction mixture is cooled and at the same time 300 g of butyl glycol and 666 g of a polypropylene [1]) designated in the following as epoxy resin (EEW 188) glycol diglycidyl ether having an EEW of 333 (DER 732 from Dow Chemical) are added. 105 g of 2,2'-aminoethoxyethanol ($H_1N-CH_2-CH_2-O-CH_2-CH_2-OH$ ) and, 10 minutes later, 51 g of N,N-dimethylaminopropylamine (0.5 mol) are added at 90° C. After a brief exothermic reaction the reaction mixture is kept for 2 hours at 90° C. until viscosity remains constant, and is then diluted with 520 g of butyl glycol. The resin has a solids content of 69.7% (measured for 1 hour at 130° C.) and a viscosity of 2.2 d Pas (measured in a plate-cone viscometer on a 40% resin solution diluted with propylene glycol monomethyl ether [1]) at 23° C).

[1]) designated as Solvenon PM (manufacturer BASF) in the following

1.2 Grinding resin A2

In a reaction vessel described above 915.1 g of an epoxy resin based on bisphenol A (EEW 188), 277.5 g of bisphenol A and 212.5 g of dodecylphenol together with 73.9 g of xylene are heated to 130° C. 2.8 g of N,N-dimethylbenzylamine are added and after a brief exothermic reaction the reaction mixture is kept at 130° C. until the EEW has risen to 1150. It is then diluted with 395.5 g of butyl glycol with cooling and, as soon as the temperature has fallen below 100° C., 213.2 g of 2,2'-aminoethoxyethanol are added in one portion. An exothermic reaction sets in and after about 20 minutes the temperature drops again to 100° C. 1041.7 g of Grilonit F 713 (polytetrahydrofuran diglycidyl ether having an EEW of 428 from Ems-Chemie) are then run in over 20 minutes and allowed to react at 100° C. until the viscosity remains constant and no more epoxide is detectable (about 2 hours). The mixture is then diluted with 670.6 g of butyl glycol.

The clear, colorless resin solution has a solids content of 70.0% (1 hour at 130C.) and a viscosity of 3.35 d Pas (40% solution in Solvenon PM; platecone viscometer at 23°C.). The base content is about 0.74 meq/g of solid resin.

1.3 Grinding resin A3

The procedure described under 1.1 for the grinding resin A1 is followed, but the EEW of the first reaction stage is 860:

| | |
|---|---|
| 30.29 | parts of epoxy resin (EEW 188) |
| 9.18 | parts of bisphenol A |
| 7.04 | parts of dodecylphenol |
| 2.37 | parts of butyl glycol |
| 0.07 | parts of triphenylphosphine |
| 9.91 | parts of butyl glycol |
| 17.88 | parts of DER 732 (polypropylene glycol diglycidyl ether from Dow Chemicals) |
| 4.23 | parts of 2,2'-aminoethoxyethanol |
| 1.37 | parts of N,N-dimethylaminopropylamine |
| 17.66 | parts of butyl glycol |

Resin characteristics:

| Solids content: | 69.8% (1 hour at 130° C.) |
|---|---|
| Viscosity: | 5.5 d Pas (40% solution in Solvenon PM) |
| MEQ base: | 0.88 meq/g of solid resin |

1.4 Grinding resin A4

Using the same procedure as that in 1.1, 627.5 g of epoxy resin (EEW 188) and 190.2 g of hisphenol A are reacted in the presence of 43.1 g of butyl glycol and 1.2 g of triphenylphosphine at 130° C. to form an intermediate having an EEW of 490. 401.7 g of butyl glycol and 1428.5 g of Grilonit F713 are then added with cooling. 62.7 g of N-methylethanolamine are added at 60° C. whereupon the temperature rises to 64° C. 10 minutes later, with further cooling, 168.5 g of n-hexylamine and after a further 10 minutes 42.5 g of N,N-dimethylaminopropylamine are added. The exothermic reaction which ensues is allowed to proceed and the temperature is increased to 110° C. by gentle heating. The reaction mixture is kept for a further 2 hours at this temperature until the viscosity remains constant. It is then cooled and diluted with 635.3 g of butyl glycol.

| Solids content: | 70.3% (1 hour at 130° C.) |
|---|---|
| Viscosity: | 2.6 d Pas (40% solution in Solvenon PM, plate-cone viscometer at 23° C.). |
| MEQ base: | 1.24 meq/g of solid resin |

1.5 Grinding resin A5

The example describes the preparation of an aqueous grinding resin solution with a low solvent content. The organic solvent (butyl glycol) content is in this case about 5.7%, or 17.6% based on solid resin. Using the same procedure as in 1.1, 564 g of epoxy resin (EEW 188), 171 g of hisphenol A and 196 g of dodecylphenol are first reacted in the presence of 88 g of butyl glycol and 3.4 g of triphenylphosphine at 130° C. until an EEW of 1210 is reached. The reaction mixture is then cooled to 90° C. and at the same time 749 g of DER 732 (EEW 333 from Dow Chemicals) are added. 105 g of 2,2'-aminoethoxyethanol are then added with further cooling, the temperature rising briefly to 98° C. 20 minutes later, when the temperature has again dropped to 90° C., 51 g of N,N-dimethylaminopropylamine are added and allowed to react at this temperature until no further viscosity rise is noticeable (about 2 hours; viscosity 2.6 d Pas, 40% solution in Solvenon PM). The reaction mixture is then diluted with a mixture of 24 g of glacial acetic acid and 3550 g of deionized water and discharged. The aqueous solution of the cationized resin has a solids content of 32.2% (1 hour at 130° C.).

1.6 Grinding resin A6 (comparison example)

27.81 parts of bisphenol A diglycidyl ether having an EEW of 188, 1.44 parts of xylene and 5.81 parts of hisphenol A are allowed to react in the presence of 0.002 parts of triphenylphosphine at 150°-160° C. until an EEW of 345 is reached. The reaction mixture is then diluted with 21.61 parts of butyl glycol and cooled to 49° C. A mixture of 7.77 parts of 9-amino-3,6-dioxanonan-1-ol[1]) and 4.07 parts of N,N-dimethylaminopropylamine is added in the course of 6 minutes and the temperature rises to 110° C. The mixture is kept for 1 hour between 110 and 115° C., 6.45 parts of butyl glycol are added and the reaction mixture is cooled to 77° C. 14.9 parts of nonylphenol glycidyl ether are added subsequently whereupon the temperature rises to 90° C. and is kept at this level for 1 hour, the mixture is then diluted with 10.03 parts of butyl glycol and cooled. The solids content of the resin solution of low viscosity is 60%.

[1]) manufacturer Union Carbide

2. Preparation of the pigment pastes

For the preparation of the pigment pastes deionized water, acetic acid (90%), an antifoam, if appropriate, and the grinding resin are first mixed according to the table of quantities below. Carbon black, basic lead silicate, extender, titanium dioxide (type R900) and the crosslinking catalyst are added and the mixture is stirred for 30 minutes in a high-speed dissolver. The mixture is then dispersed in a laboratory mill for 1 to 1.5 hours to give a Hegmann fineness of less than 12 and, if necessary, its viscosity is adjusted to the desired working viscosity with additional water. The amounts stated are understood to be proportions by weight. Aqueous pigment pastes which resist separation into component parts are obtained in the described cases, the examples B1–B5 describing gray pastes, B6 a comparison paste and B7 a black paste. In addition, B5 describes a paste having a very low organic solvent content (about 5%, based on paste solids).

TABLE 1

| | Pigment pastes B1 to B7 | | | | | | |
|---|---|---|---|---|---|---|---|
| | B1 | B2 | B3 | B4 | B5 | B6 | B7 |
| Grinding resin | | | | | | | |
| type | A1 | A2 | A3 | A4 | A5 | A6 | A3 |
| amount | 18.50 | 18.50 | 18.50 | 18.50 | 40.12 | 21.60 | 17.0 |
| Deionized water | 34.27 | 34.27 | 34.27 | 34.27 | 12.62 | 29.33 | 40.7 |
| Acetic acid (90%) | 0.45 | 0.45 | 0.45 | 0.45 | 0.48 | 1.59 | 0.4 |
| Antifoam[1]) | — | — | — | — | — | 0.70 | — |
| Carbon black | 0.50 | 0.50 | 0.50 | 0.50 | 0.50 | 0.50 | 2.1 |
| Lead pigment | 4.80 | 4.80 | 4.80 | 4.80 | 4.80 | 4.80 | 4.2 |
| Extender[2]) | 6.75 | 6.75 | 6.75 | 6.75 | 6.75 | 6.75 | 34.1 |
| Titanium dioxide | 32.48 | 32.48 | 32.48 | 32.48 | 32.48 | 32.48 | — |
| Dibutyltin oxide | 2.25 | 2.25 | 2.25 | 2.25 | 2.25 | 2.25 | 1.5 |
| | 100 | 100 | 100 | 100 | 100 | 100 | 100 |

[1])Tristar Antifoam from Tristar Chemical Co., Dallas (USA)
[2])For B1-B6: HEWP from English China Clay International; for B7: Blanc fixe

3. Cathodically depositable synthethic resins

3.1 Resin 1

Corresponding to Example II.2 described in German Patent Application DE-P 3918 511.7, 1.351 g of an epoxy resin based on hisphenol A (EEW 490 from Shell) and 81 g of xylene are melted under nitrogen at 110° C. with stirring. After the addition of 181 g of dodecylphenol the residual traces of water are distilled off azeotropically at 111° C. under reduced pressure. The reaction mixture is then heated to 130° C. and at the same time 2.4 g of N,N-dimethylbenzylamine are added. The mixture is kept at this temperature for about 4 hours until the EEW has risen to 1109. 190 g of xylene and 101 g of diethanolamine are added and at the same time the slightly exothermically reacting mixture is cooled to 90° C. After the diethanolamine has been allowed to react for 1 hour, 1085 g of the urethane-containing ketimine adduct described below and 12 g of deionized water are added. The mixture is allowed to react for 2 hours at 90° C. is then cooled to 70° C. and discharged without further dilution.

The resin has a solids content of 83.1% (measured for 1 hour at 130° C.) and a base content of 0.67 meq/g of solid resin.

Urethane-containing ketimine adduct 1403 g of the polyether diol Pluriol PE 3100[1] are dissolved in 230 g of methyl isobutyl ketone, dewatered by azeotropic distillation and reacted with 668 g of Desmodur W[2] (isocyanate equivalent weight of 131 from Bayer) until an isocyanate equivalent weight of 852 (based on solids) is reached. The mixture is then reacted with 633 g of a ketimine solution, obtainable by reacting 1100 g of 2,2'-aminoethoxyethanol and 1886 g of methyl isobutyl ketone with water separation (amine equivalent weight 265), until no more isocyanate groups are detectable (IR spectrum). The reaction mixture is then diluted with 128 g of butyl glycol and 104 g of methyl isobutyl ketone. The solution has a theoretical solids content of 80%, the base content is about 0.82 meq/g solid resin. The viscosity (60% dilution with Solvenon PM, plate-cone viscometer) is 7.2 d Pas.

[1] from BASF; polyether diol based on ethylene oxide and propylene oxide having an average molecular weight of about 1100 (2) Desmodur W=dicyclohexylmethane diisocyanate

3.2 Resin 2

1818 g of epikote 1001 (EEW 490 from Shell), 243 g of dodecylphenol and 108 g of xylene are introduced into a reaction vessel and melted at 110° C. in an inert gas atmosphere. Traces of water are then removed by distillation under slightly reduced pressure. 3.3 g of N,N-dimethylbenzylamine are then added, the reaction mixture is heated to 130° C. and kept at this temperature for about 3 hours until the EEW has risen to 1110. It is then cooled and 135 g of butyl glycol, 136 g of diethanolamine and 239 g of xylene are added in rapid succession. The temperature rises briefly. The reaction mixture is then cooled to 90° C. and kept at this temperature for a further 30 minutes. It is then further diluted with 135 g of propylene glycol monophenyl ether and 340 g of isobutanol and cooled to 65° C. 43 g of N,N-dimethylaminopropylamine are then added to the mixture and allowed to react at 80° C. for 3 hours.

The resin solution has a solids content of 70%, a base content of 0.96 meq/g and a viscosity of 4.2 d Pas (40% solution in Solvenon PM, plate-cone viscometer at 23° C.).

4. Crosslinking agents

4.1 Crosslinking agent 1

1133 g of toluylene diisocyanate (mixture of about 80% of 2,4 and 20% of 2,6 isomers) and 356 g of methyl isobutyl ketone are introduced in an atmosphere of nitrogen into a reaction vessel fitted with a stirrer, reflux condenser, internal thermometer and inert gas inlet. 0.7 g of dibutyltin dilaurate are added, followed by the addition in the course of 4 hours of 290 g of trimethylolpropane added in small portions at equal intervals. Cooling is controlled in such a way that the temperature of the reaction mixture does not exceed 45° C. 30 minutes after the last portion of trimethylolpropane has been added, an NCO equivalent weight of 217 (based on the solids) is measured. 722 g of n-propyl glycol are then added dropwise in the course of 1 hour with further cooling. At the end of this addition the temperature has risen to 86° C. The mixture is heated to 100° C. and the reaction is allowed to proceed for one further hour.

At the subsequent check NCO groups are no longer detectable. The mixture is cooled and diluted with 500 g of methyl isobutyl ketone. The solution of this polyurethane crosslinking agent has a solids content of 69.8% (measured for 1 hour at 130° C.).

4.2 Crosslinking agent 2

In the same reaction vessel as described in the preceding example, 1146 g of trimerized hexamethylene diisocyanate having an NCO equivalent weight of 191 (Basonat PLR 8638 from BASF) and 339 g of methyl isobutyl ketone are heated to 50° C. in an atmosphere of nitrogen with stirring. 774 g of di-n-butylamine are then added dropwise in the course of 4 hours.. The temperature is kept below 55° C. by cooling. The solution of the crosslinking agent is then cooled and diluted with a further 141 g of methyl isobutyl ketone. The solids content is 80.2% (measured for 1 hour at 130° C.).

Cathodically depositable aqueous binder dispersions

The preparation of the aqueous binder dispersions is carried out from the components listed in the table below (Table 2) in amounts by weight given therein. The procedure is as follows:

Resin, crosslinking agents and additives are mixed at room temperature and treated with the amount of glacial acetic acid provided for this purpose. The first amount of water (H₂O I) is then stirred in in portions.

The solvents and other paint auxiliary substances are then added, if appropriate, the mixture is homogenized for a short time and diluted with the second amount of water (H₂O II) added in small portions until the final solids content is reached.

In a subsequent vacuum distillation the dispersions are freed from volatile solvents, the dispersions being thus concentrated to a theoretical solids content of 35% (dispersion 1) or the distillatively removed solvent being replaced, amount per amount, by water (dispersion 2). The dispersion is then filtered.

TABLE 2

| Aqueous binder dispersions (parts by weight in g) | | |
|---|---|---|
| Dispersion | 1 | 2 |
| Resin 1 | 878.8 | — |
| Resin 2 | — | 956.8 |
| Crosslinking agent 1 | 220.9 | 257.6 |
| Crosslinking agent 2 | 193.2 | 225.4 |
| Plastilit 3060[1] | 89.6 | 89.6 |
| Antifoam[2] | 2.2 | 2.2 |
| Isobutanol | 150.0 | — |
| Glacial acetic acid | 17.8 | 16.3 |
| H₂O I | 839.7 | 694.3 |
| H₂O II | 1760.0 | 960.0 |

[1] polypropylene glycol compound from BASF
[2] 50% solution of Surfynol (from Air Products) in butyl glycol The dispersions have a solids content of 34.9% (dispersion 1) and of 35.2% (dispersion 2, measured in each case for 1 hour at 130° C.).

6. Preparation of the electrocoating baths and deposition of paint films

In order to be tested as cathodically depositable electrocoating paints, the aqueous binder dispersions from Table 2 are diluted with deionized water and 10% acetic acid in the amounts by weight stated in each case below.

The pigment paste in question from Table 1 is then incorporated with stirring into the binder dispersion diluted in this way.

The electrocoating baths are allowed to age for 5 days at room temperature with stirring. The deposition of the paint film is carried out during 2 minutes at the stated voltage onto cathodically connected zinc-phosphated steel test panels as well as onto cathodically connected non-pretreated steel panels. The bath temperature is kept at 27° C. The deposited wet films are rinsed with deionized water and baked for 20 minutes at 165° C.

6.1 Electrocoating bath 1

| | |
|---|---|
| 459 | parts of deionized water |
| 1 | part of acetic acid (10%) |
| 430 | parts of dispersion 1 and |
| 110 | parts of pigment paste B1 |
| are converted into an electrocoating paint as described above. The solids content of the bath is 20%. | |

After deposition at 300 volt and baking a smooth, glossy film is obtained having very good resistance to solvents and a film thickness of 28 μm.

| | |
|---|---|
| Flow-out* | 2 |
| Erichsen cupping | 7 |
| Crosshatch test* | 0 |

*Rating: 0 best, 5 worst

6.2 Electrocoating bath 2

In a manner already described an electrocoating bath is prepared in the same manner as electrocoating bath 1. The amounts of the components are identical but in this case the dispersion 2 and as pigment paste B4 are used. The solids content is 20%.

After deposition at 260 Volt and baking a smooth film is obtained having a very good solvent resistance and a film thickness of 25 μm.

| | |
|---|---|
| Flow-out | 1-2 |
| Erichsen cupping | 7 |
| Crosshatch test | 0 |

6.3 Electrocoating baths 3, 4 and 5

In the manner described above three electrocoating baths are prepared from dispersion 2 and the pigment pastes B2, B3 and the comparison paste B6. The amounts used are identical for all 3 baths:

| | |
|---|---|
| 2295 | parts of deionized water |
| 5 | parts of acetic acid (10%) |
| 2150 | parts of dispersion 2 |
| 550 | parts of pigment paste |

The solids contents of the baths are 20%. The deposition and testing of the baths is carried out on zinc-phosphated steel panels. For the salt mist spray test according to ASTM steel panels without pretreatment are used during 360 hours. The voltages are chosen such that in all cases approximately equal film thicknesses are achieved. The test results are listed in Table 3.

TABLE 3

| Electrocoating baths 3-5, deposition and testing | | | |
|---|---|---|---|
| Bath | 3 | 4 | 5 (comparison) |
| Paste | B2 | B3 | B6 |
| Film thickness (μm) | 25 | 24 | 24 |
| Voltage (Volt) | 300 | 320 | 280 |
| Flow-out | 1-2 | 1 | 1-2 |
| Erichsen cupping | 7 | 7 | 7 |
| Reverse impact[1] (inch pound) | >80 | >80 | 40 |
| Bending test[2] (cm) | 0 | 0 | 1 |
| Crosshatch test | 0 | 0 | 0 |
| Salt mist spray test (undermigration from the cut in mm) | <1 | <1 | <1 |

[1] According to ASTM D 2794 method
[2] Bending test on a conical mandrel according to ISO Standard 6860 in cm (0 = best)

6.4 Electrocoating bath 6 (comparison)

A further electrocoating bath (bath 6) is prepared for comparison. The bath contains a cathodically depositable aqueous binder dispersion, dispersion 3 to which a polyoxypropylenediamine has been admixed according to German Patent Application DE 3,801,786. The preparation is carried out according to the method described in section 5 from the following components:

| | | |
|---|---|---|
| 915 | parts | Resin 2 |
| 246 | parts | Crosslinking agent 1 |
| 215 | parts | Crosslinking agent 2 |
| 134 | parts | Jeffamin D 2000 ®[1] |
| 2 | parts | Antifoam[2] |
| 22 | parts | Glacial acetic acid |
| 706 | parts | $H_2O$ I |
| 960 | parts | $H_2O$ II |

[1] Commercial product from Texaco Chemical Company, polyoxypropylenediamine having the formula
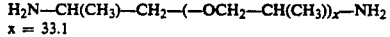
$H_2N-CH(CH_3)-CH_2-(-OCH_2-CH(CH_3))_x-NH_2$
x = 33.1
[2] cf. Table 2

The resultant aqueous dispersion is freed from low-boiling solvents by vacuum distillation and is then diluted with deionized water to a solids content of 35%.

An electrocoating bath (bath 6) is prepared in the manner described above from 2295 parts of deionized water, 5 parts of acetic acid (10%), 2150 parts of the dispersion 3 and 550 parts of the pigment paste B6.

| Deposition and testing: | |
|---|---|
| Film thickness: | 25 μm |
| Voltage: | 260 V |
| Flow-out: | 1-2 |
| Erichsen cupping: | 7 |
| Reverse impact (inch pound) | 80 |

6.5 Testing of the electrocoating baths 3-6 for stone chip resistance

To test the stone chip resistance the electrocoated, zinc-phosphated steel panels are coated with a typical automobile finishing system, each applied paint film being baked separately. Composition of the multicoat paint system:

25 μm electrocoating paint
35 μm filler (polyester-based, FC80-0100 BASF L+F)
35 μm topcoat ( two-component, high-solids paint FD73-0782 from BASF L+F)

The listed film thicknesses are understood to be dry film thicknesses. The steel panels coated in this manner are subjected to a test for stone chip resistance using a Hahnpick testing instrument according to the test method DIN 55995 (Mercedes Benz DBL 7292). The results are listed in Table 4. The temperatures given in the table are the test temperatures.

TABLE 4

| | Individual results of stone chip resistance testing of coated electrocoating paint films | | | |
|---|---|---|---|---|
| Bath | 3 | 4 | 5 (comparison) | 6 (comparison) |
| at +23° C.: | | | | |
| Rebound value[1] | 2 | 1 | 3 | 6 |
| Penetration rating[2] | 0.5 | 0 | 1 | 0.5 |
| at −20° C.: | | | | |
| Rebound value[1] | 3.8 | 5 | 7 | 18 |
| Penetration rating[2] | 2 | 1 | 2 | 0 |

[1] Rebound value represents the chipping of the topcoat film and/or filler film of the electrocoating paint film, measured in mm². The target is as low a value as possible.
[2] Penetration rating assesses the degree of destruction of the total paint film and is a measure of the exposed blank metal surface, also designated as degree of rusting. Rating 0 to 5, 0 = best, 5 = worst.

For the assessment of the stone chip resistance it is essential that the rebound values and at the same time the penetration ratings are minimal both at +23° C. and at −20° C.

6.5 Electrocoating bath 7

The example describes a black-pigmented electrocoating paint. The preparation is carried out by the procedure described in section 6 from the following components:

| | |
|---|---|
| 406 | parts of deionized water |
| 1 | part of acetic acid (10%) |
| 496 | parts of dispersion 2 |
| 97 | parts of pigment paste B7 |

| Deposition and testing of the films: | | |
|---|---|---|
| | Bath 7 | Comparison[1] |
| Film thickness | 22 μm | — |
| Voltage | 300 V | — |
| Flow-out | 1–2 | — |
| Erichsen cupping | 7–8 | 3–5 |
| Bending test using a conical mandrel (cm) | 0 | >6 |
| Reverse impact (inch pound) | 80 | <10 |
| GM gravelometer test[2] | | |
| at +20° C. | 7 | 4 |
| at −18° C. | 7 | 4 |

[1] Black electrocoating paint corresponding to the state of the art (Cathodip ® black, FT 85-9480, BASF L + F)
[2] Test for stone chip resistance according to General Motors, method GME 60268, rating 0–10.
0 = worse
10 = best

6.6 Electrocoating baths 8 and 9

| | Bath 8 | Bath 9 |
|---|---|---|
| Deionized water | 2295 | 2295 |
| Acetic acid (10%) | 5 | 5 |
| Dispersion 1 | 2150 | 2150 |
| Pigment paste parts by weight | 550 | 550 |
| type | B5 | B6 |

| -continued | | |
|---|---|---|
| | Bath 8 | Bath 9 |
| | | (comparison) |

Bath 8 represents an example of a paint according to the invention. Bath 9 represents a comparison example and corresponds in its composition to the electrocoating bath 2 described in Patent Application DE 3,918,511.

A sample of the paint from bath 9 taken after 5 days' ageing contains butyl glycol as the sole solvent in an amount of 0.5% by weight (determined by gas chromatography). An analogous determination for bath 8 gives 0.15% by weight of butyl glycol as the sole solvent. This corresponds to a calculated VOC (volatile organic compounds including glacial acetic acid) value of about 0.2.

| Deposition and testing of the films: | | |
|---|---|---|
| | Bath 8 | Bath 9 (comparison) |
| Film thickness (μm) | 24 | 25 |
| Voltage[1] (Volt) | 340 | 320 |
| Flow-out | 1–2 | 1–2 |
| Reverse impact (inch pound) | 80 | 40 |
| Bending test on the conical mandrel (in cm) | 0 | 1 |

[1] Deposition at a compensating resistance of 150 Ohm.

We claim:

1. A process for the coating of electrically conducting substrates in which
   (1) the electrically conducting substrate is immersed in an aqueous electrocoating paint,
   (2) the substrate is connected as cathode,
   (3) a film is deposited on the substrate using direct current,
   (4) the coated substrate is removed from the electrocoating paint, and
   (5) the deposited paint film is baked,
wherein the aqueous electrocoating paint is produced by the use of a pigment paste which comprises as grinding resin an at least partially protonated epoxide-amine adduct which is obtained by reacting
   (A) a glycidyl ether of a polyphenol which contains on statistical average at least one epoxide group in the molecule, or a mixture of such glycidyl ethers,
   (B) a polyglycidyl ether of a polyol which contains on statistical average more than 1.0 epoxide groups in the molecule, or a mixture of such polyglycidyl ethers, and
   (C) a compound which contains a primary amino group in the molecule or a mixture of such compounds
so that component (C) joins together molecules of component (A) and molecules of component (B) in a chain-extension to give an epoxide-amine adduct which is at least partly protonated, components (A) and (B) being employed in an equivalent ratio of from 1.0:0.5 to 1.0:8.0, and from 0.3 to 0.7 mol of component (C) being employed per equivalent of epoxide groups from (A) and (B).

2. The process claimed in claim 1, wherein (A), (B) and (C) are reacted with each other in such a stoichiometric ratio that the resultant epoxide-amine adduct is free from epoxide groups.

3. The process as claimed in claim 1, wherein mixtures of glycidyl ethers are used as the component (A) which are obtained by preparing, in the presence of a catalyst which catalyzes the reaction between phenolic hydroxyl groups and epoxide groups, from
   (a) a diglycidyl ether of a polyphenol having a number average molecular weight of 260 to 450, or a mixture of such diglycidyl ethers,
   (b) an unsubstituted or substituted monophenol having 1 to 18 carbon atoms in the alkyl radical, or a mixture of such monophenols, and
   (c) a diphenol and/or a catalyst which catalyzes the reaction between aliphatic hydroxyl groups and epoxide groups,
said glycidyl ethers having a number average molecular weight of 980 to 4000, and which contain on statistical average 1.0 to 3.0 epoxide groups and 0.25 to 1.3 phenyl ether groups derived from component (b) per molecule.

4. The process as claimed in claim 1, wherein polyglycidyl ethers of polyether polyols, having a number average molecular weight of 300 to 3000 are used as the component (B).

5. The process as claimed in claim 1, wherein the components (A) and (B) are used in an equivalent ratio of 1.0:1.0 to 1.0:2.0.

6. The process as claimed in claim 1, wherein 0.4 to 0.6 mol of the component (C) are used per equivalent of epoxide groups from (A) and (B).

7. The process as claimed in claim 1, wherein 2,2'-aminoethoxyethanol, N,N-dimethylaminopropylamine, hexylamine or unsubstituted or substituted aniline are used as the component (C).

8. An aqueous paint which comprises an at least partially portonated expoxide-amine adduct which is obtained by reacting
   (A) a glycidyl ether of a polyphenol which contains on statistical average at least one epoxide group in the molecule, or a mixture of such glycidyl ethers,
   (B) a polyglycidyl ether of a polyol which contains on statistical average more than 1.0 epoxide groups in the molecule, or a mixture of such polyglycidyl ethers, and
   (C) a compound which contains a primary amino group in the molecule or a mixture of such compounds
so that component (C) joins together molecules of component (A) and molecules of component (B) in a chain-extension to give the expoxide-amine adduct which is at least partly protonated, components (A) and (B) being employed in an equivalent ratio of from 1.0:0.5 to 1.0:8.0, and from 0.3 to 0.7 mol of component (C) being employed per equivalent of epoxide groups from (A) and (B).

9. The paint as claimed in claim 8, wherein (A), (B) and (C) are reacted with each other in such a stoichiometric ratio that the resultant epoxide-amine adduct is free from expoxide groups.

10. The paint as claimed in claim 8, wherein mixtures of glycidyl ethers are used as the component (A) which are obtained by preparing, in the presence of a catalyst which catalyzes the reaction between phenolic hydroxyl groups and expoxide groups, from
   (a) a diglycidyl ether of a polyphenol having a number average molecular weight ob 260 to 450, or a mixture of such diglycidyl ethers,
   (b) an unsubstituted or substituted monophenol having 1 to 18 carbon atoms in the alkyl radical, or a mixture of such monophenols, and
   (c) a diphenol and/or a catalyst which catalyzes the reaction between aliphatic hydroxyl groups and epoxide groups,
said glycidyl ethers having a number average molecular weight of 980 to 4000, and which contain on statistical average 1.0 to 3.0 epoxide groups and 0.25 to 1.3 phenyl ether groups derived from component (b) per molecule.

11. The paint as claimed in claim 8, wherein polyglycidyl ethers of polyether polyols, having a number average molecular weight of 300 to 3000 are used as the component (B).

12. The paint as claimed in claim 8, wherein the components (A) and (B) are used in an equivalent ratio of 1.0:1.0 to 1.0:2.0.

13. The paint as claimed in claim 8, wherein 0.4 to 0.6 mol of the component (C) are used per equivalent of epoxide groups from (A) and (B).

14. The paint as claimed in claim 8, wherein 2,2'-aminoethoxyethanol, N,N-dimethylaminopropylamine, hexylamine or unsubstituted or substituted aniline are used as the component (C).

15. An epoxide-amine adduct which is obtained by reacting
   (A) a glycidyl ether of a polyphenol which contains on statistical average at least one epoxide group in the molecule, or a mixture of such glycidyl ethers,
   (B) a polyglycidyl ether of a polyol which contains on statistical average more than 1.0 epoxide groups in the molecule, or a mixture of such polyglycidyl ethers, and
   (C) a compound which contains a primary amino group in the molecule or a mixture of such compounds
so that component (C) joins together molecules of component (A) and molecules of component (B) in a chain-extension to give an exoside-amine adduct which is at least partly protonated, components (A) and (B) being employed in an equivalent ratio of from 1.0:0.5 to 1.0:8.0, and from 0.3 to 0.7 mol of component (C) being employed per equivalent of epoxide groups from (A) and (B).

16. The epoxide-amine adduct as claimed in claim 15, wherein (A), (B) and (C) are reacted with each other in such a stoichiometric ratio that the resultant epoxide-amine adduct is free from epoxide groups.

17. The epoxide-amine adduct as claimed in claim 15, wherein mixtures of glycidyl ethers are used as the component (A) which are obtained by preparing, in the presence of a catalyst which catalyzes the reaction between phenolic hydroxyl groups and epoxide groups, from
   (a) a diglycidyl ether of a polyphenol having a number average molecular weight of 260 to 450, or a mixture of such diglycidyl ethers,
   (b) an unsubstituted or substituted monophenol having 1 to 18 carbon atoms in the alkyl radical, or a mixture of such monophenols, and
   (c) a diphenol and/or a catalyst which catalyzes the reaction between aliphatic hydroxyl groups and epoxide groups,
said glycidyl ethers having a number average molecular weight of 980 to 4000, and which contain on statistical average 1.0 to 3.0 epoxide groups and 0.25 to 1.3 phenyl ether groups derived from component (b) per molecule.

18. The epoxide-amine adduct as claimed in claim 15, wherein polydlycidyl ethers of polyether polyols, having a number average molecule weight of 300 to 3000 are used as the component (B).

19. The epoxide-amine adduct as claimed in claim 15, wherein the components (A) and (B) are used in an equivalent ratio of 1.0:1.0 to 1.0:2.0.

20. The epoxide-amine adduct as claimed in claim 15, wherein 0.4 to 0.6 mol of the component (C) are used per equivalent of epoxide groups from (A) and (B).

* * * * *